(12) United States Patent
Mori et al.

(10) Patent No.: US 7,534,382 B2
(45) Date of Patent: May 19, 2009

(54) INSERT INJECTION MOLDING METHOD AND JIG

(75) Inventors: Takeshi Mori, Nakano-ku (JP); Kenji Kodaira, Nakano-ku (JP); Fumio Taniguchi, Nakano-Ku (JP); Shigekazu Okamura, Minato-Ku (JP); Masahiro Fujii, Minato-Ku (JP)

(73) Assignee: Calsonic Kansei Corporation, Saitama-ken (JP)

( * ) Notice: Subject to any disclaimer, the term of this patent is extended or adjusted under 35 U.S.C. 154(b) by 922 days.

(21) Appl. No.: 10/895,376

(22) Filed: Jul. 21, 2004

(65) Prior Publication Data

US 2005/0017408 A1    Jan. 27, 2005

(30) Foreign Application Priority Data

Jul. 23, 2003    (JP) ............................. 2003-277941

(51) Int. Cl.
    *B29C 45/14* (2006.01)
(52) U.S. Cl. .................. 264/229; 264/274; 264/275; 264/313; 425/127; 425/129.1

(58) Field of Classification Search ................ None
    See application file for complete search history.

(56) References Cited

U.S. PATENT DOCUMENTS

| | | | | | |
|---|---|---|---|---|---|
| 4,065,190 | A | * | 12/1977 | Hallerback | .................. 384/493 |
| 4,800,057 | A | * | 1/1989 | Rabe | ........................... 264/229 |
| 5,306,454 | A | * | 4/1994 | Lagergvist | .................. 264/135 |

* cited by examiner

*Primary Examiner*—Edmund H. Lee
(74) *Attorney, Agent, or Firm*—Wenderoth, Lind & Ponack, L.L.P.

(57) ABSTRACT

A radiator core support is made by an insert injection molding method. Four core members shaped in a triangular prism are built into a quadric-prism core and inserted into a rectangular tube, an upper radiator core support member. Then, an outwardly pressing member is inserted into a longitudinal slanted hole of the core to move and contact its members to the inner surfaces of the tube. The tube is located in a mold, into which molten molding material is injected. The tube is overmolded at the tops of a hood lock stay, and right and left side support members, being integrally formed out of resin. After cooling, the method includes drawing the pressing member from the core; then the core from the mold; and the molded part is removed from the mold.

7 Claims, 6 Drawing Sheets

INSERT INJECTION MOLDING METHOD AND JIG

BACKGROUND OF THE INVENTION

1. Field of the Invention

The present invention relates to an insert injection molding method in which an insert is located in a mold in advance of a molten molding material injection and then molded by molding material at its outer peripheral sides of the insert to obtain a molded part integrally formed with the insert and the molding material, and also relates to its jig used in the injection method.

2. Description of the Related Art

An insert injection molding method of this kind is disclosed in Japanese patent laying-open publication (Tokkaihei) No. 11-277579. In this method, an insert, such as a pipe, is positioned in a mold in advance of a molten molding material injection, reinforced with a core pin arranged in a hole of the insert against pressure of the molding material during injection. The core pin is made smaller in diameter than the hole of the insert to have a gap between them for easy inserting and drawing-out.

The above known conventional method, however, encounters such a problem in that the gap between the insert and the core pin can not prevent from causing deformation of the insert, especially when the insert has a flat or plane portion, for the plane portion can be easily deformed by molten molding material injected under pressure as compared with a round portion. When the gap is set smaller in order to minimize the above disadvantage, the core is inserted into or drawn out of the insert in a press fit state to generate a large friction force between them during its inserting and drawing-out, thereby causing troublesome work.

It is, therefore, an object of the present invention to provide an insert injection molding method which overcomes the foregoing drawbacks and in which a core can be easily inserted into and drawn out of an insert having a plane surface, and a molded part can be formed without deformation of the insert caused by a molten molding material injected under pressure.

It is another object of the present invention to provide a jig which can be used suitably for the above insert injection molding method.

SUMMARY OF THE INVENTION

According to the first aspect of the present invention there is provided an insert injection molding method in which an insert having an angled portion formed by a first and second plane portions thereof intersecting and integral with each other is overmolded by molding material at outer peripheral sides of the first and second plane portions so that the insert and the molding material are integrally formed with each other, the insert injection molding method comprising the steps of: preparing the insert and a jig comprising a core insertable into and drawable out of the insert and an outwardly pressing member insertable into and drawable out of the core, the core comprising a plurality of core members with a plane surface which include a first and second core members divided at the angled portion of the insert when the core members are built according to the insert in advance of a molten molding material injection into a mold; inserting the core into the mold so that the plane surfaces of the first and second core members respectively face to inner sides of the first and second plane portions of the insert; inserting and locating the insert with the core into the mold; inserting the outwardly pressing member into the core to press the first and second core members outwardly and bring the plane portions of the first and second core members in contact with the inner sides of the first and second plane portions of the insert respectively; injecting the molten molding material under pressure into a cavity of the mold in which the insert with the core and the outwardly pressing member is located; cooling the molten molding material in the mold to be a molded part; drawing the outwardly pressing member out of the core; drawing the core out of the mold; and removing the molded part from the mold.

Therefore, in this insert injection molding method, the core can be easily inserted into an insert having a plane surface and drawn out of the insert, and a molded part can be formed without deforming the insert during a molten molding material injection.

According to the second aspect of the present invention there is provided a jig used in an insert injection molding method in which an insert having an angled portion formed by a first and second plane portions thereof intersecting and integral with each other is overmolded by molding material at outer peripheral sides of the first and second plane portions so that the insert and the molding material are integrally formed with each other, the jig comprising; a core insertable into and drawable out of the insert; and an outwardly pressing member insertable into and drawable out of the core; wherein the core comprises a plurality of core members with a plane surface which include a first and second core members divided at the angled portion of the insert when the core members are built according to the insert, the plane surfaces of the core members being respectively contactable with inner sides of the first and second plane portions of the insert when the core members are inserted into the insert; and the outwardly pressing member having a pressing portion to press the core members outwardly and bring the plane surfaces in contact with inner sides of the first and second plane portions of the insert respectively when the outwardly pressing member is inserted into the core.

Therefore, in this insert injection molding method, by using the above jig, the core can be easily inserted into an insert having a plane surface and drawn out of the insert, and a molded part can be formed without deforming the insert during a molten molding material injection.

Preferably, in the above method, at least one of the core members has a cavity portion on the plane portion thereof, and the molten molding material pressing to deform the first plane portion of the insert into the cavity portion of the core member to form a cavity portion of the insert filled with the molten molding material by the injecting.

This method enables the insert and its filling portion of the molded part to be firmly connected with each other so as to prohibit relative movement between them.

Preferably, the above jig has at least one of the core members having a cavity portion on the plane portion thereof to receive a deformed portion of the insert caused by the molten molding material injection under pressure.

This jig enables the insert and its filling portion of the molded part to be firmly connected with each other so as to prohibit relative movement between them.

Preferably, inwardly projecting length of the cavity portion of the insert is set to be smaller than a gap between the insert and the core when the outwardly pressing member is drawn out of the core.

This results in that the cavity portion of the insert and the core become free from each other, which the core can be easily brought out of the insert.

Preferably, the core has a longitudinal hole whose dimension becomes smaller when the longitudinal hole becomes deeper, and the outwardly pressing member having a pressing portion, insertable into and drawable out of the longitudinal hole of the core, whose external dimension becomes small toward an edge thereof.

This brings simple structure to the core and the outwardly pressing member for moving the core members outwardly in the insert.

Preferably, the longitudinal hole of the core is formed by cut-away portions at tops opposite to the plane surfaces of the core members.

This brings simple structure to the core members for obtaining the longitudinal hole of the core.

Preferably, the molded part is a radiator core support of a motor vehicle which has an upper radiator core support member and a lower radiator core support member both extending in a lateral direction of a vehicle body, and at least one of the upper and lower radiator core support members being the insert made of metal.

By this insert injection molding method, the radiator core support with mechanical strength and high accuracy can be easily obtained.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

Figure 1:
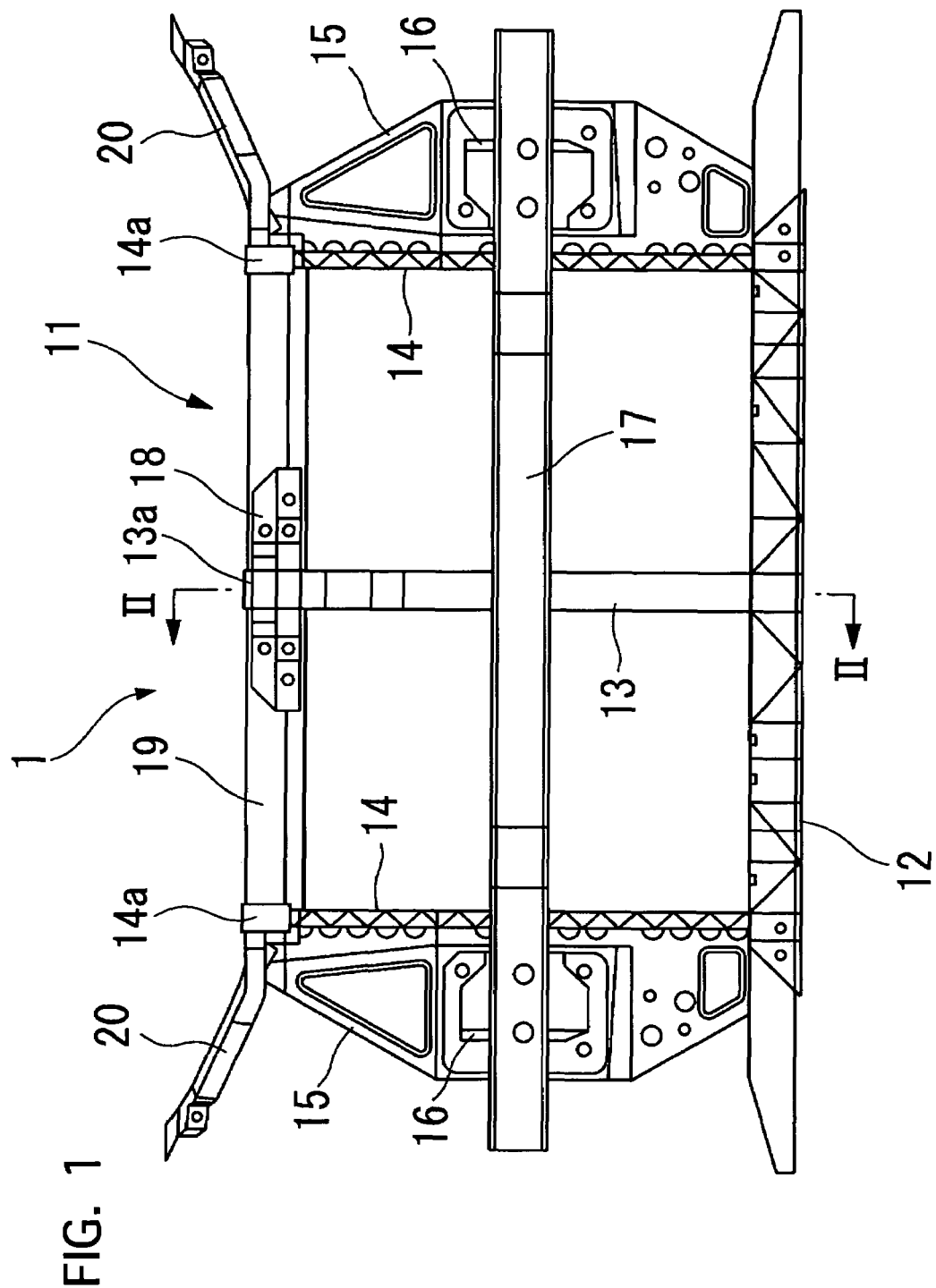
FIG. 1 is a front view of a radiator core support of a motor vehicle, which is formed to be a molded parts by a insert injection molding method of an embodiment according to the present invention, and a bumper armature attached to the radiator core support trough an attachment, such as bumper stays and side stays.

Throughout the following detailed description, similar reference characters and numbers refer to similar elements in all figures of the drawings.

Figure 2:
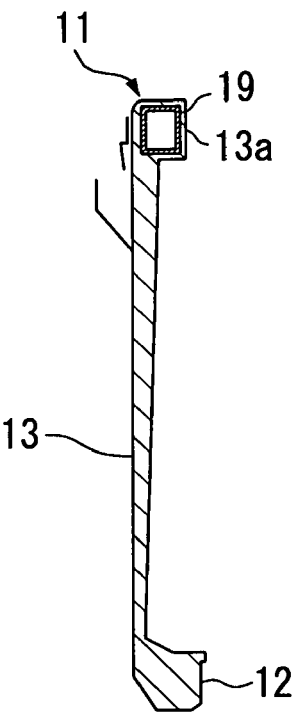
FIG. 2 is a sectional side view of the radiator core support taken along a line II-II in FIG. 1.
Figure 3:
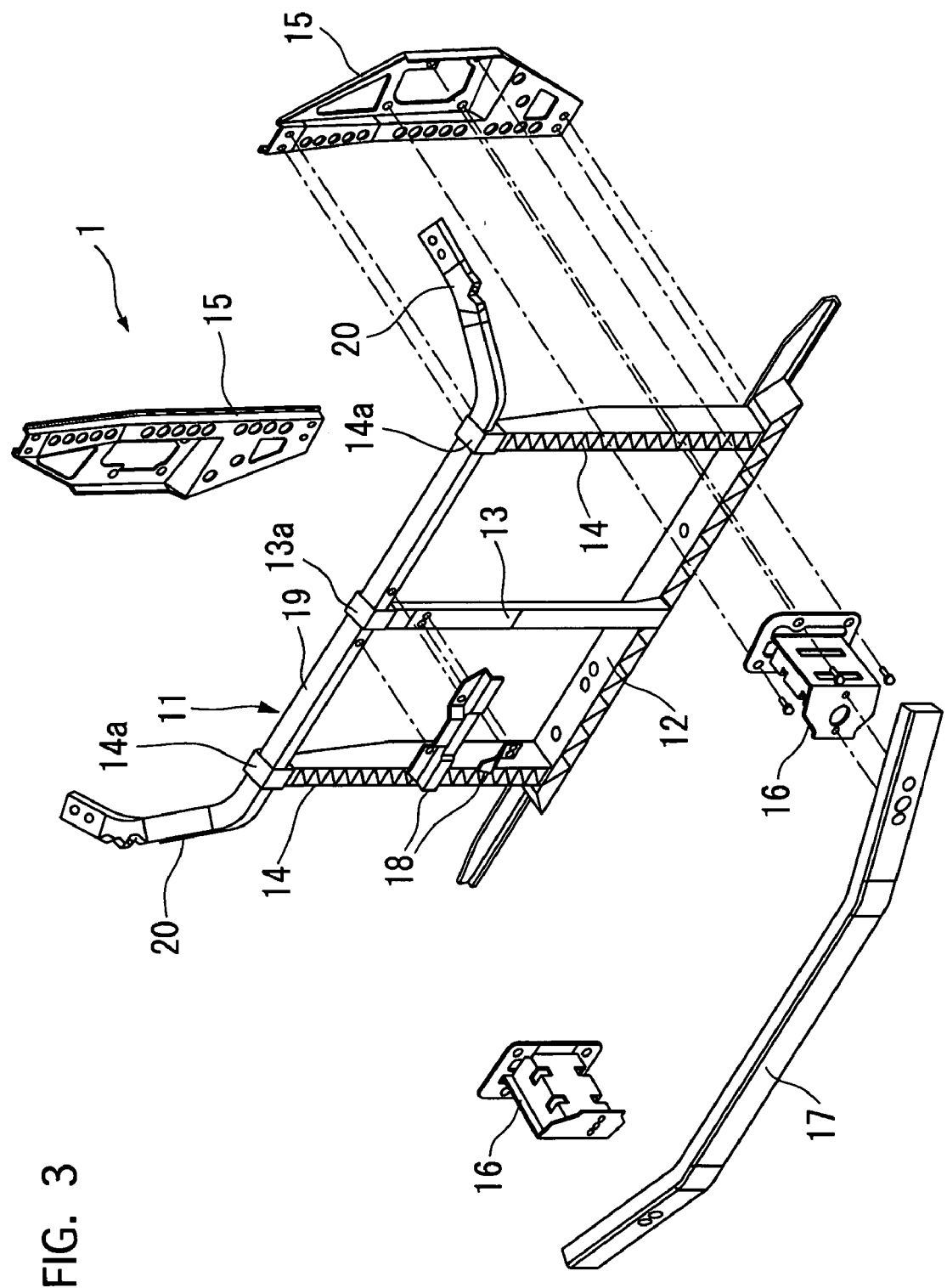
FIG. 3 is an exploded perspective view of the radiator core support with the bumper armature and its attachment shown in FIG. 1.

Referring to FIGS. 1 to 3 of the drawings, there is shown a radiator core support 1 of a motor vehicle, a molded part made by an insert injection molding method of a first preferred embodiment according to the present invention.

A radiator, not shown, is used for cooling coolant by air flow entering the radiator to get rid of excess engine heat, and is resiliently supported by the radiator core support 1. The radiator core support 1 is mounted to the front end portion of a motor vehicle body.

The radiator support 1 comprises upper radiator core support member 11 extending in a lateral direction of the vehicle body, a lower radiator core support member 12 extending in the lateral direction and located to be separated vertically from the upper radiator core support member 11, a hood lock stay 13 extending vertically to connect center portions of the upper and lower support members 11 and 12 with each other, a right side support member 14 connecting right side portions of the upper and lower support members 11 and 12 with each other, and a left side support member 14 connecting left side portions of the upper and lower support members 11 and 12 with each other.

The upper radiator core support member comprises a rectangular tube 19 which is made of steel, and extends in the lateral direction and right and left attachment portions 20 and 20 made of steel which are respectively secured by bolts at its inner end portions to the right and left edge portions of the tube 19 and extend in the lateral direction to be bolted at its outer end portions to a vehicular body, not shown. The tube 19 has four angled portions formed by neighboring two portions, a long portion and a short portion, among four plane portions intersecting and integral with each other. The neighboring two plane portions among the four plane portions correspond to a first and second plane portions of the present invention.

The lower radiator core support member 12, and right and left side support members 14 and 14 are formed out of resin, such as glass-fiber reinforced resin, in a shape like a channel having therein a plurality of alternately slanted ribs which are arranged to run in a zigzag line to reinforce mechanical strength of the members 12, 14 and 14.

The radiator core support 1 is integrally formed by an insert injection molding method: the lower radiator core support member 12, the hood lock stay 13 and right and left side support members 14 and 14 are integrally formed out of resin so that they are integrally connected with the tube 19 at their tops, which have overmolded portions 13a, 14a, and 14a, enclosing to adhere to the outer surfaces of the tube 19. This manufacturing processes will be described later in detail with reference to the drawings.

The integrally formed radiator core support 1 is, furthermore, provided with various parts: On the top portion of the hood lock stay 13, a hood lock 13, made of steel, is bolted. To the right and left side support members 14 and 14, right and left side stay plates 15 and 15, made of steel, are respectively attached by bolts. To the front sides of the right and left side stay plates 15 and 15, right and left bumper stays 16 and 16 are respectively fixed by bolts to support a bumper armature 17. The bumper stays 16 and 16 and the bumper armature 17 are also made of steel.

A radiator core support assembly, including the radiator core support 1 with the radiator, the bumper armature 17, and the others, is conveyed as a front end module to a vehicle body assembly firm for being mounted to a vehicle body.

Next, the insert injection molding method used in forming the radiator support 1 will be described in detail with reference to the drawings of FIGS. 4 to 10.

At first, the rectangular tube 19 as an insert and a jig 2 are prepared in advance of a molten molding material injection into a mold for producing the radiator core support 1.

Figure 4:
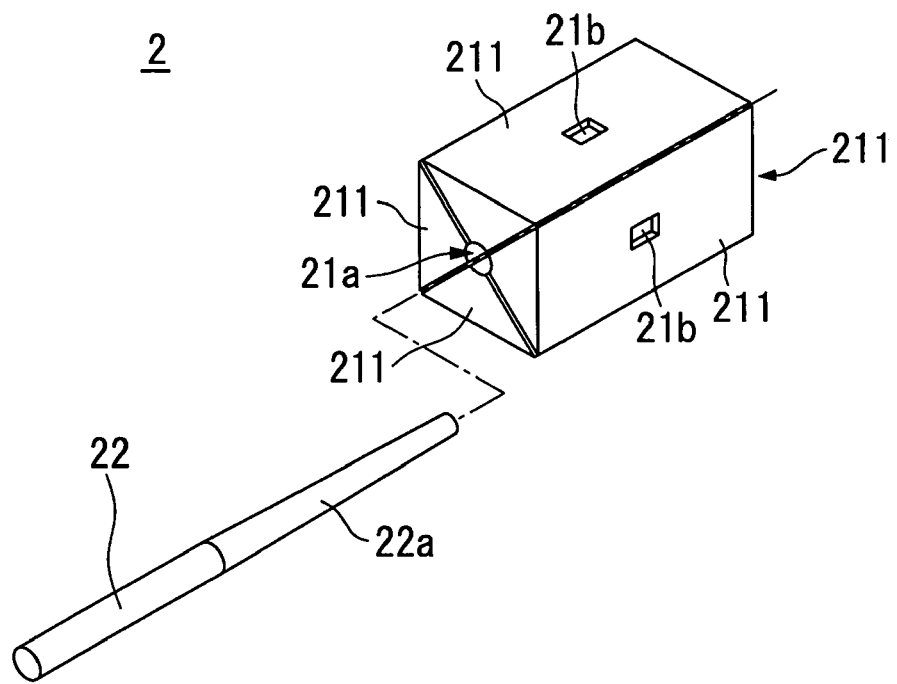
FIG. 4 is a perspective view of a jig, which is an preferred embodiment of the another invention and used in an insert injection molding method according to the first invention, comprising a core consisting of four core members and to be inserted into an insert during a molten molding material injection and an outwardly pressing member to be inserted into the core during the injection into a mold cavity.

The jig 2, as shown in FIG. 4, includes a core 21 which is insertable into and drawable out of the tube 19 and a outwardly pressing member 22 which is insertable into and drawable out of the core 21.

The core 21, as best shown in FIG. 4, consists of four core members 211 each shaped like a triangular prism and having a cut-away portion at its top portion and a cavity portion 21b on a flat surface opposite to the cut-away portion. These core members 211 can be collectively built into the quadric prism, whose outside dimension is smaller than an inner space of the tube 19, so that each cavity portion 21b is positioned on one of outer peripheral surfaces of the quadric prism respectively and the cut-away portions are positioned at the center of the prism to collectively form a longitudinal hole 21a. The longitudinal hole 21a is formed to have a slanted inner surface so that the deeper the hole 21a becomes, its dimension of cross-section becomes smaller.

Note that the dimensions of the core members 211 and the tube 19 are set in such a manner that gaps are provided in longitudinal and lateral directions between the core members 211 without the pressing member 22 and the tube 19, thereby permitting the core members 211 to move outwardly more than depth of the cavity portions 21b.

On the other hand, the pressing member 22 is shaped like a columnar rod and has a pressing portion 22a insertable into and drawable out of the longitudinal hole 21a of the core 21. This pressing portion 22a is formed to have a slanted outer surface corresponding to the inner surface of the hole 21a of the core 21 so that its dimension of cross section becomes smaller toward the edge thereof.

Figure 5:
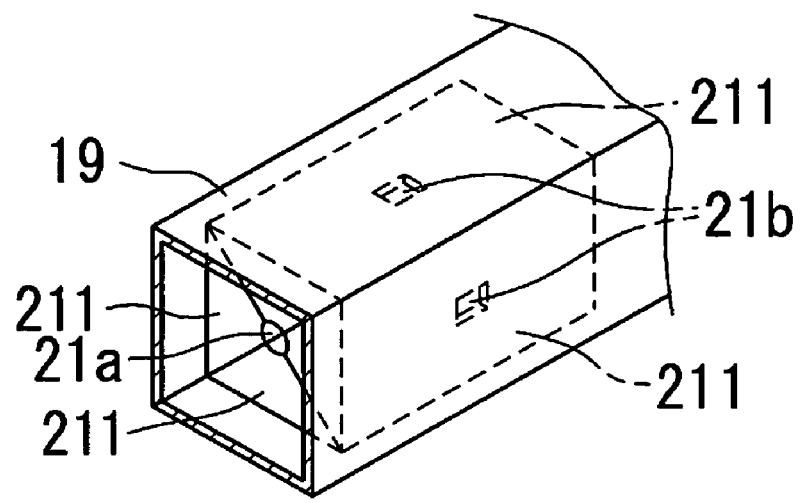
FIG. 5 is a perspective view showing a state in which the core members are inserted into the insert in advance of locating the insert in a mold.

At the following step, the four core members 211 are built into the quadric prism core 21 as shown in FIG. 4 and inserted into the rectangular tube 19, the insert, as shown in FIG. 5, As the core 21 is dimensioned smaller than the inner space of the tube 19, the longitudinal and lateral gaps caused between the core 21 and the tube 19 to enable the core 21 to enter the tube 19 easily.

Figure 6:
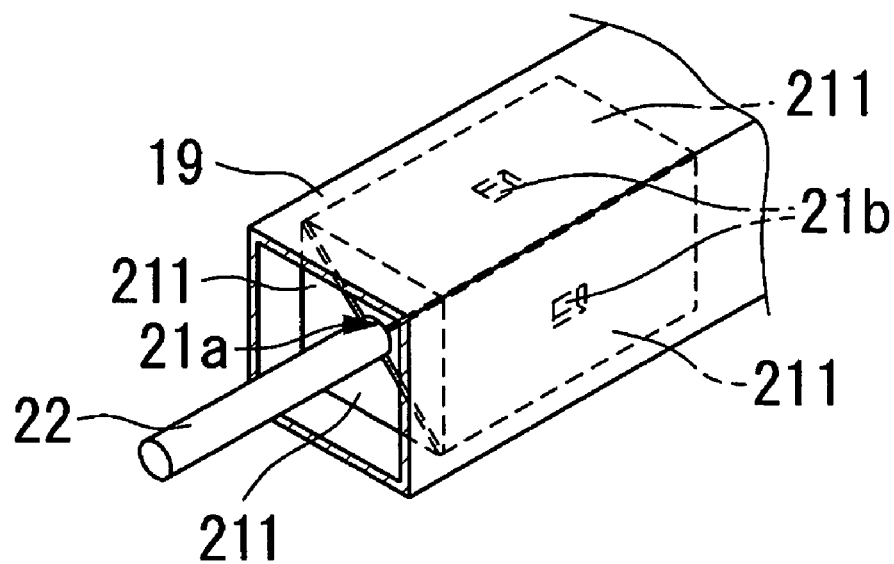
FIG. 6 is a perspective view showing a state in which the outwardly pressing member is inserted into a hole of the core after the state shown in FIG. 5 and also positioned in the mold in advance of the injection into the mold cavity.

In this state, the pressing member 22 is inserted into the longitudinal hole 21a of the core 21, with pressing the core members 211 to move outwardly due to wedge effect between the slanted surfaces of them as the pressing member 22 moves deeper into the hole 21a. Finally, as shown in FIG. 6, the pressing member 22 is prevented from moving forward further at a position where the outer flat surfaces of the core members 211 respectively contacts with the inner surfaces of the tube 19. This contact results in that the core members 211 are apart from each other to cause gaps h between the neighboring members 211 and between the members 211 and the tube 19, shown in FIG. 9, at four angled portions of the tube 19. Regardless of this contact between the outer surfaces of the core members 211 and the inner surfaces of the tube 19, the cavity portions 21b of the core members 211 are apart from the tube 19. This relation among the tube 19, the core members 211, and the outwardly pressing member 22 is similar to the relation illustrated in FIG. 9, although this drawing shows a state of a post-process.

At the next step, the tube 19, having the core 21 and the pressing member 22 inside of it, are positioned properly in the opened mold in advance of the molten molding injection.

Figure 7:
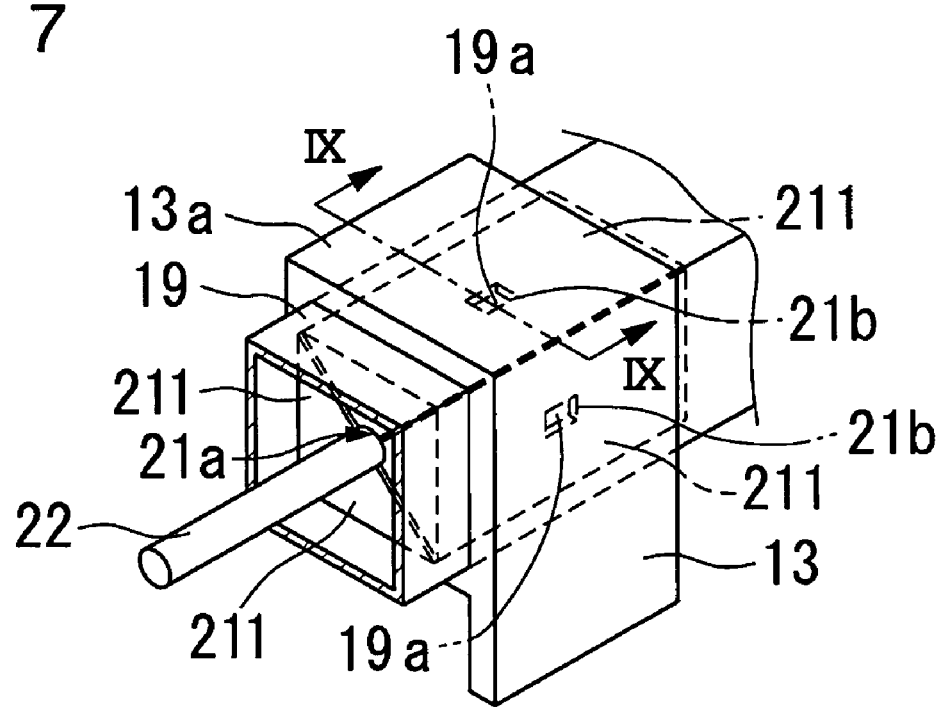
FIG. 7 is a fragmentary perspective view of an overmolded portion formed at top of an upper radiator core support member of the radiator core support, showing a state in which the molten molding material is injected into the mold and fills up the mold cavity with the insert and the pressing member inside of it.
Figure 9:
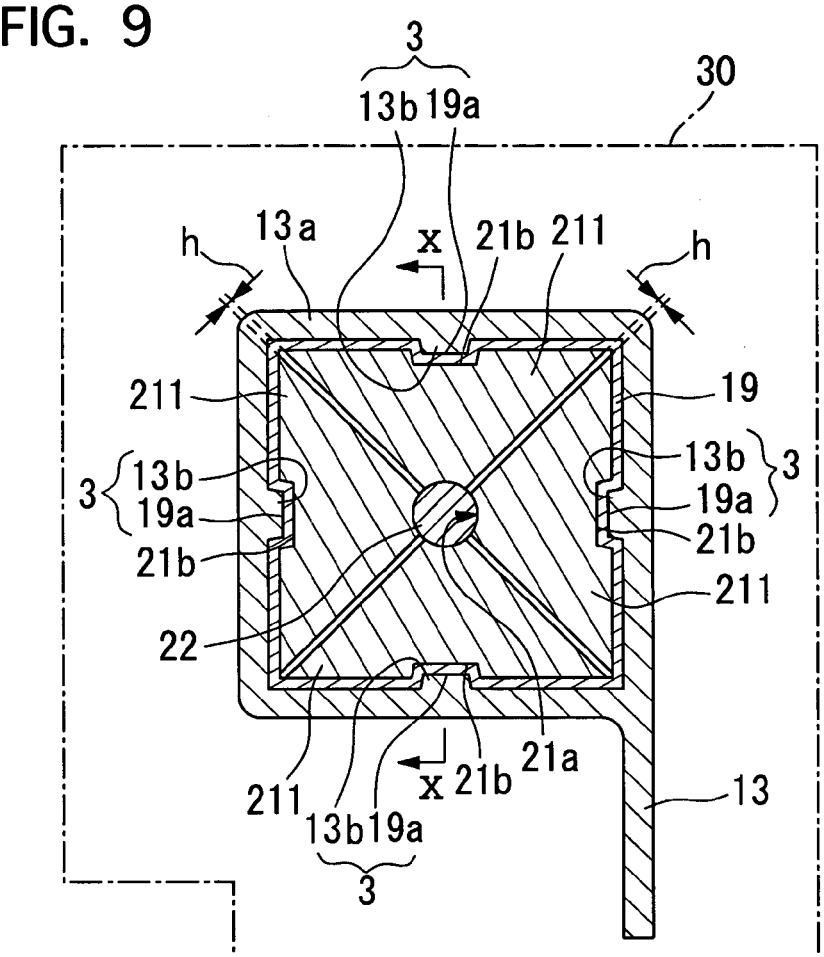
FIG. 9 is a fragmentary enlarged sectional side view showing the overmolded portion of the upper radiator core support member, with the insert and the pressing member in it, of the radiator core support taken along a line IX-IX in FIG. 7.

After positioning the tube 19, the mold is closed, and then molten molding material is injected under pressure into a cavity of the mold 30, only shown in FIG. 9. The molten molding material fills the mold cavity and integrally forms the lower radiator core support member 12, the hood lock stay 13, and the right and left side support members 14 and 14 with overmolding the tube 19 as shown in FIGS. 7, 9, and 10.

Figure 10:
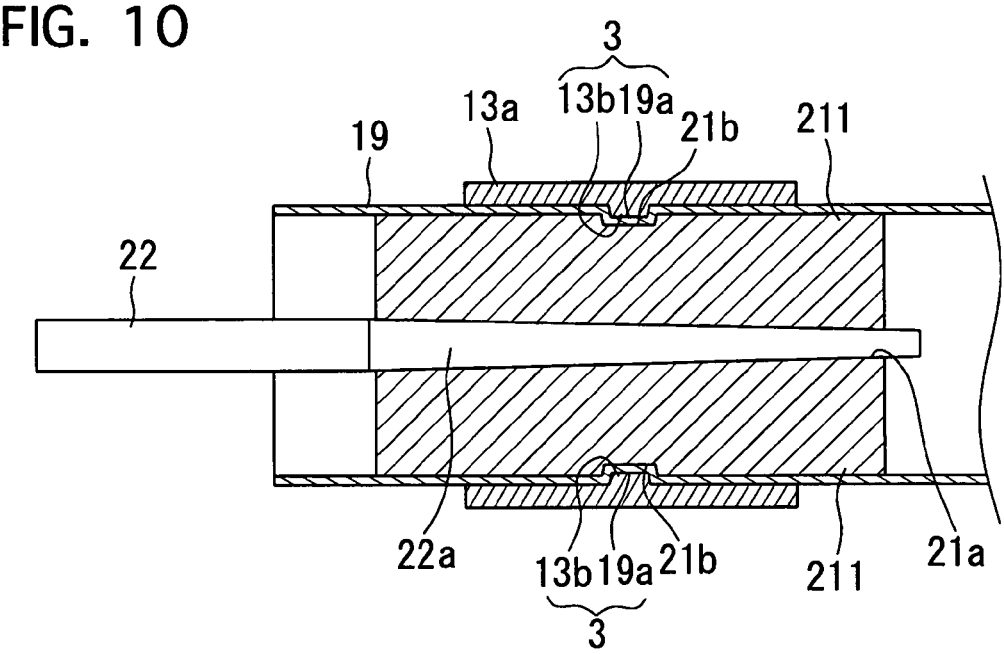
FIG. 10 is a sectional view showing the overmolded portion of the upper radiator core support member with the insert and the pressing member taken along a line X-X in FIG. 9.

During this injection, the pressurized molding material presses four portion of the tube 19 corresponding to the cavity portions 21b of the core members 211 to be deformed into the cavity portions 21b to be cavity portions 19a, as shown in FIGS. 9 and 10. The cavity portions 19a are filled up by and adhered to inner projections 13b projecting from the inner surfaces of the overmolding portions 13a, 14a, and 14a. These retaining portions 3, comprising the cavity portions 21b and projections 13b, prohibit the tube 19 from moving with respect to the hood lock stay 13, and the right and left side support members 14 and 14.

Note that the molten molding material injected under pressure only deforms the cavity portions 19a of the tube 19 regardless of existence of gaps h between the core members 211 and the tube 19, because flat surface portions of the tube 19 are reinforced by the core members 211 whose flat surfaces are contacting with the inner flat surfaces of the tube 19 and the angled portions are stronger than the flat surface portions due to their configurations.

The molding material in the mold cavity becomes to harden progressively by cooling and gives the perfect reproduction of the mold 30. After this hardening, the pressing member 22 is drawn out of the hole 21a of the core 21, which can be easily done because of the slanted surfaces of the core members 211 and the pressing member 22. This drawing-out results in that the core members 211 moves inwardly so that the cavity portions 21b become free from the cavity portions 19a of the tube 19, which enables the core members 211 to be extracted from the tube 19.

Figure 8:
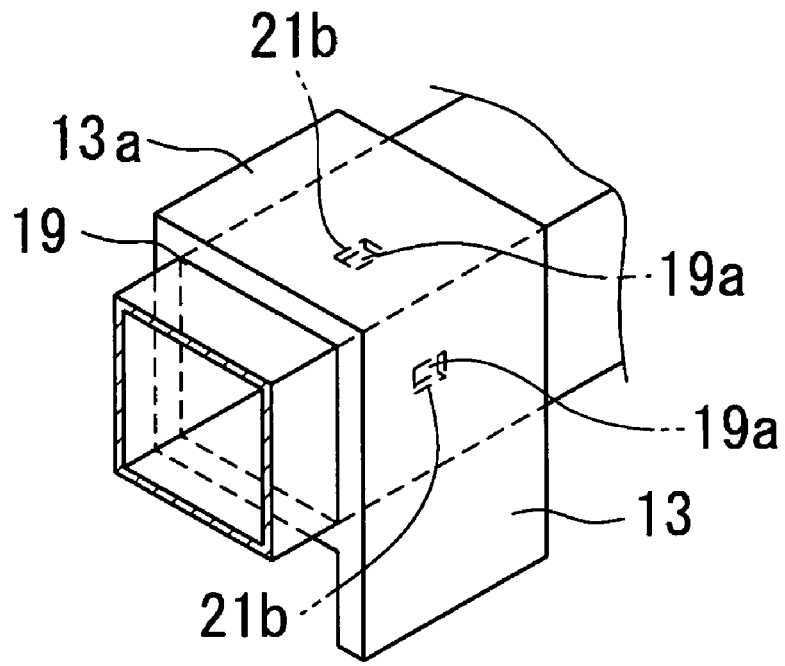
FIG. 8 is a fragmentary perspective view showing a state in which the pressing member is drawn out of the core and then the core out of the insert.

After drawing the core members 211 out of the tube 19 as shown in FIG. 8, the molded part is removed from the opened mold 30.

Note that FIGS. 7, and 8 to 10 illustrates a connecting portion of the tube 19 and the hood lock stay 13, which is similar to connecting portions of the tube 19 and the right and left side support members 14 and 14.

The entire contents of Japanese Patent Application (Tokugan) No. 2003-277941 filed Jul. 23, 2003 are incorporated herein by reference.

While there have been particularly shown and described with reference to preferred embodiments thereof, it will be understood that various modifications may be made therein, and it is intended to cover in the appended claims all such modifications as fall within the true spirit and scope of the invention.

For example, the insert may be located at any other member or members of a radiator core support member, where needs mechanical strength and/or accuracy. The insert may be made of other material and any other shaped one having at least one angled portion formed by two plane portions thereof intersecting and integral with each other, shaped in such as a letter L, a channel, a triangle, or a polygon in cross section. In these cases, the number and configurations of core members are changed according to the insert.

The number of cavity portions 21b of the core members 211 may be at least one, and its shape is arbitrary.

Although the core members 211 are built outside of the tube 19 in advance of their insertion into the tube 19 in the above embodiment, they may be inserted and built in the tube 19 simultaneously, or the core members 211 may be inserted into the tube 19, followed by building them in the tube 19.

What is claimed is:

1. An insert injection molding method in which an insert having an angled portion formed by first and second plane portions thereof intersecting and integral with each other is overmolded by molding material at outer peripheral sides of the first and second plane portions so that said insert and the molding material are integrally formed with each other, the insert injection molding method comprising the steps of:
   preparing said insert and a jig comprising a core insertable into and drawable out of said insert and an outwardly pressing member insertable into and drawable out of said core, said core comprising a plurality of core members with a plane surface, said plurality of core members including first and second core members divided at the angled portion of said insert when said core members are built according to said insert in advance of a molten molding material injection into a mold;
   inserting said core into said insert so that the plane surfaces of said first and second core members respectively face to inner sides of the first and second plane portions of said insert;
   inserting and locating said insert with said core into the mold;
   inserting the outwardly pressing member into said core to press said first and second core members outwardly and bring the plane portions of said first and second core members in contact with the inner sides of the first and second plane portions of said insert respectively;
   injecting the molten molding material under pressure into a cavity of the mold in which said insert with the core and the outwardly pressing member is located;
   cooling the molten molding material in the mold to be a molded part;
   drawing said outwardly pressing member out of said core;
   drawing said core out of the mold; and
   removing the molded part from the mold.

2. The insert molding method as set forth in claim 1, wherein at least one of said core members has a cavity portion on the plane portion thereof, and the molten molding material pressing to deform the first plane portion of said insert into the cavity portion of said core member to form a cavity portion of said insert filled with the molten molding material by said injecting.

3. The insert molding method as set forth in claim 2, wherein an inwardly projecting length of the cavity portion of said insert is set to be smaller than a gap between said insert and said core when said outwardly pressing member is drawn out of said core.

4. The insert molding method as set forth in claim 1, wherein said core has a longitudinal hole whose dimension becomes smaller when the longitudinal hole becomes deeper, and said outwardly pressing member having a pressing portion, insertable into and drawable out of the longitudinal hole of said core, whose external dimension becomes small toward an edge thereof.

5. The insert molding method as set forth in claim 4, wherein the longitudinal hole of said core has a slanted inner surface, and the pressing portion of said outwardly pressing member having a slanted surface to meet the slanted inner surface of the longitudinal hole of said core.

6. The insert molding method as set forth in claim 4, wherein the longitudinal hole of said core is formed by cutaway portions at tops opposite to the plane surfaces of said core members.

7. The insert molding method as set forth in claim 1, wherein the molded part is a radiator core support of a motor vehicle which has an upper radiator core support member and a lower radiator core support member both extending in a lateral direction of a vehicle body, and at least one of the upper and lower radiator core support members being said insert made of metal.

* * * * *